United States Patent Office 3,486,924
Patented Dec. 30, 1969

1

3,486,924

PLASTIC LABELS COATED WITH CROSS-LINKED POLYVINYL CHLORIDE-EPOXIDE-ANHYDRIDE MIXTURE

Walt J. Flanner, Jr., St. Louis, Mo., assignor to Unitog Company, Kansas City, Mo., a corporation of Missouri No Drawing. Filed Feb. 14, 1966, Ser. No. 527,085
Int. Cl. C09d 3/58; C08f 19/14
U.S. Cl. 117—38 8 Claims

ABSTRACT OF THE DISCLOSURE

An improved plastic label, process for producing the same, and composition used in such production, such plastic label having increased temperature resistance to both laundering and dry-cleaning, such increased resistance being associated with the use of a coating composition comprising (a) polyvinyl chloride resin, (b) an epoxide selected from the group consisting of linear and branched chain-aliphatic epoxides containing more than two functional sites, and (c) an organic acid anhydride containing at least two functional sites; the combined average functionality of the expoxide and acid anhydride components of said composition being at least about 5.

This invention relates to modified polyvinyl chloride compositions, to methods for their preparation and use and to articles produced therefrom. More particularly, it relates to novel polyvinyl chloride compositions which having particular utility in connection with the preparation of labels and to methods for preparing and using such compositions and to articles produced therefrom.

In copending application Ser. No. 311,318, filed on Sept. 25, 1963, and in co-pending application Ser. No. 527,074 a continuation-in-part of said copending application Ser. No. 311,318, filed on even date herewith (the disclosures of which are hereby incorporated herein by reference), novel modified polyvinyl chloride compositions are described which are particularly useful in the fabrication of labels which have excellent laundering and dry cleaning resistance. Such compositions contain as essential ingredients a polyvinyl chloride resin, a linear or branched chain-aliphatic epoxide containing more than two functional sites, an organic acid anhydride containing at least two functional sites and a plasticizer which is non-reactive with the remaining components of the composition and which is compatible therewith.

In said copending application filed on even date herewith, various formulations are described, certain of such formulations being particularly adapted for the preparation of labels to be used in dry cleaning situations, others of said formulations being adapted particularly for use in label fabrication to be used in laundering situations and still other formulations representing a compromise between the first two in which the relative quantities of materials utilized are optimized to give the labels ultimately made from such formulations the greatest balanced resistance to degradation resulting from laundering and dry cleaning environments.

When formulations are prepared in accordance with the teachings of said copending applications in order to impart to them ideal resistance to extraction in chlorinated dry cleaning solvents while retaining good flexibility, the resistance to temperatures above 275° F. of labels made from such formulations are substantially impaired or even eliminated. Under such circumstances, when such labels are subjected to the high pressing temperatures used commercially, degradative softening of the label occurs. On the other hand, when the formulation is modified to provide it with greater temperature resistance, the labels tend to become rigid and brittle.

2

In accordance with the present invention, it has now been discovered that the lack of temperature resistance occasioned by optimizing a given formulation for maximum resistance to chlorinated dry cleaning solvents may be readily obtained by coating labels fabricated from the novel compositions of said copending applications with a novel heat shield.

It is accordingly a primary object of the present invention to provide a novel composition particularly adapted for increasing the temperature resistance of plastic labels, and to plastic labels incorporating such novel composition.

It is still a further important object of the present invention to provide a novel heat-shield composition which makes possible the use of a single formulation for making plastic labels which can be both laundered and dry cleaned, and to plastic labels incorporating such heat-shield composition.

It is another important object of the present invention to provide a novel composition comprising a modified polyvinyl chloride plastisol formulation having high functionality which is particularly well adapted for increasing the temperature resistance of pastic labels prepared in accordance with said copending applications and otherwise, and to plastic labels incorporating such novel composition.

These and other important objects and advantages of the present invention will become more apparent through reference to the ensuing description and appended claims.

Like the novel compositions described in said copending application, the novel heat-shield formulation of the present invention comprises four essential ingredients: (a) a polyvinyl chloride resin; (b) a linear or branched chain-aliphatic epoxide containing more than two functional sites; (c) an organic acid anhydride containing at least two functional sites; and (d) a plasticizer which is non-reactive with the other components of said composition and which is compatible therewith.

In said copending application filed on even date herewith, it was pointed out that the combined average functionality of the epoxide-acid anhydride components of the formulation had to be greater than two to achieve the results described therein. The formulation of the present invention differs from those of said copending application in that the epoxide-acid anhydride portion of the former must have a significantly higher degree of functionality than the latter, viz., at least about five, to achieve the results for which such formulation is designed. This higher degree of functionality results in a product having a much higher crosslink density and greatly improved thermal resistance.

In said copending application filed on even date herewith, it was also pointed out that the lower preferred average functionality of the epoxide-acid anhydride mixture (preferably three) could be obtained by mixing an acid anhydride having a low number of functional sites (i.e., two) with a high functionality anhydride (such as one containing four or five functional sites), an example of the former being hexahydrophthalic anhydride and of the latter being pyromellitic dianhydride. As will be apparent, the high functionality required of the heat-shield formulations of the present invention may be obtained by increasing the quantity of the highly functional acid anhydride in the formulation which is prepared.

In the preferred embodiment of this invention, the formulation used to form the plastic labels are of the plastisol type. Plastisols are suspensions of finely ground particles of resinous polymers in a compatible fluid plasticizer. When heated to the proper temperature, the plastisol changes into a homogeneous rubber-like material which is particularly adapted for use in the present invention.

The materials useable in the formulations of the present application are the same as those described in copending application Serial No. 527,074. Thus, the polyvinyl chloride component of the formulation described above is, in a preferred embodiment of the present invention, a homopolymer of vinyl chloride. It is within the contemplation of the present invention, however, to use copolymers of vinyl chloride with other materials such, for example, as vinylidine chloride and vinyl acetate. The use of such copolymers will permit variations in the physical properties of the formulation. Thus, the use of increasing amounts of vinyl acetate will soften the plastisol whereas increasing the amount of vinylidine chloride will increase its hardness and reduce compatibility. As a result, the dominant portion of such copolymers should be vinyl chloride. (When used in the claims, the term "polyvinyl chloride resin" shall be construed to include not only homopolymers of vinyl chloride but copolymers of vinyl chloride such as is described above wherein the vinyl chloride comprises the dominant portion of such copolymers.) The preferred molecular weight of the vinyl chloride polymer component is about 20,000–60,000 with about 40,000–60,000 being preferred, though the present invention is not limited to materials of these molecular weight ranges.

The epoxide component is a linear or branched chain-aliphatic epoxide containing more than two functional sites (though it should be noted that the epoxide can contain aromatic groups if the resultant compound is compatible with the plastisol). The epoxide should be a fluid or semi-fluid which is mixable with the other components of the formulations of the present invention. An extremely effective epoxide for this purpose is an epoxidized linseed oil containing four to five reactive epoxide groups per molecule sold under the designation "Epoxol 9–5." This epoxide has an epoxide oxygen content of at least 9% by weight. Other epoxy materials are epoxidized plasticizers commercially available under the designation "Paraplex G–62" and "Estynox 400." Aliphatic diepoxides such as the X–2670 series of epoxide resins may also be used, but the compatibility of these resins with non-reactive plasticizers is not as good as that of the other epoxides mentioned. Generally speaking, epoxides having a molecular weight of about 500–2000 are advantageously useable in the formulations of the present invention, with a molecular weight of about 700–1000 being preferred.

Any organic acid anhydride material which contains at least two functional groups and which will react with the epoxide component of the plastic formulation to form a crosslinked structure is useable in the formulations of the present invention. Examples of suitable anhydrides for this purpose are pyromellitic, phthalic and hexahydrophthalic anhydrides. As will be apparent, the particular anhydride utilized will depend upon the identity of the epoxide component of the plastic formulation. The prime consideration affecting such choice is the crosslink density desired in the final cross-linked product which is obtained from such formulation. If the crosslink density is too high, the resultant material is extremely brittle and not satisfactory for label use; too light a crosslink density, on the other hand, does not adequately trap the non-reactive plasticizer, which will be subsequently subject to solvent extraction in chlorinated dry cleaning solvents. In addition, if the crosslink density is not sufficiently high, the resistance of the label material to temperatures encountered during pressing on industrial steam presses will not be adequate and the label will soften and stick to the press. As has previously been indicated, the acid anhydride must be selected so that the combined functionality of the epoxide-acid anhydride mixture is at least five.

A great variety of non-reactive plasticizers may be useable as the fourth component of the heat-shield composition of the present invention. Such plasticizers include the phthalate esters, aliphatic diesters and polymeric plasticizers, merely to mention a few. Since labels made from the composition of the present invention must resist the effects of dry cleaning solvents, especially perchloroethylene, the polymeric plasticizers are preferred. Polymeric plasticizers such as Paraplex G–25, a polyester of about 8000 molecular weight, is particularly desirable for use in formulating compositions within the present invention. Another good non-reactive plasticizer is "Admex 760," a polymeric ester type of plasticizer of relatively high molecular weight. Exemplary of other plasticizers useable in the plastic compositions of the present invention are diesterified carboxylic acids such as dibutyl sebacate and diesterified aromatic dicarboxylic acids such as dibutyl phthalate.

Additional ingredients may be added to the four basic ingredients described above to impart specific desired properties to the novel formulations of the present invention. Details of such additional ingredients are set forth in said application filed on even date herewith.

Following is a typical formulation useable for the heat-shield composition of the present invention:

PART A

| Chemical: | Wt. percent |
|---|---|
| Epoxol E–9–5 | 34.73 |
| Polyvinyl chloride–71 | 62.67 |
| Alcolec Z–6 lecithin | .60 |
| Triphenyl phosphite | 2.00 |

PART B

| Chemical: | Wt. percent |
|---|---|
| Pyromellitic dianhydride | 21.06 |
| Hexahydrophthalic anhydride | 43.41 |
| Admex 760 | 34.33 |
| Benzyltrimethylammonium chloride | 1.20 |

In the above formulation, Epoxol E–9–5 is an epoxidized linseed oil containing four to five reactive epoxide groups per molecule. The polyvinyl chloride–71 is a homopolymer of vinyl chloride of relatively high molecular weight (about 20,000–40,000). The Alcolec Z–6 Lecithin is a proprietary item comprised of a partially hydroxylated lecithin. Lecithin can be described as one of several waxy, hydroscopic phosphatides which are found in both animals and plant organisms. Admex 760 is a non-reactive polymeric ester type plasticizer of relatively high molecular weight. The functions of each of the ingredients of the two portions set forth above are identical to those described in said copending application filed on even date herewith.

In order to achieve the desired formulation of the heat-shield material of the present invention, best results are obtained when mixing 100 parts by weight of part A to 31.6 parts by weight of part B.

To obtain the heat-shield effects of the above formulation, the composite formulation (containing the required portions of parts A and B) are screened onto the surface of a label which will be exposed after its application to the ultimate supporting substrate, a suitable thickness of the heat-shield coating being about .001 inch. The coated label is then placed in a hot air oven at 350° to 400° F. for a 45 to 75 second interval. The result will be a label having a heat shield which will significantly increase the temperature resistance of the label, making much more feasible the use of a single formulation for labels which can be both laundered and dry cleaned.

As previously indicated, the heat-shield compositions of the present application are particularly well suited for application to the surface of plastic labels such as are described in said application Ser. No. 311,318 and in said continuation-in-part of said application. A typical such plastic label is one described in Example 1 of said continuation-in-part application, which is prepared from a formulation having 120 parts by weight of a stir-in grade polyvinyl chloride resin having a molecular weight between about 20,000 and 40,000, 50 parts by weight of a linear diepoxide having a molecular weight of about 700–1000, 40 parts by weight of dioctylphthalate as a primary plasticizer and 4 parts by weight of pyromellitic dianhydride.

Since the cured polymer obtained from a formulation such as that previously described above is extremely brittle, it is highly advantageous to apply the heat-shield formulation to the label in a non-continuous or broken pattern such as can be obtained by passing the formulation through a half-tone screen or by passing it through a broken pattern screen. If a continuous film of the heat-shield formulation were to be placed on top of the label, it would tend to be quite brittle and might fracture during laundering or dry cleaning of the label.

As will be apparent, various modifications within the spirit of the present invention may be made without losing the advantages of the heat-shield formulations. For example, the relative quantities of the four essential ingredients may be varied through a reasonable range of about ±10% by weight of the formulation previously set forth.

Based upon the above indicated formulation and the variation allowed as per above, calculating the three essential components, i.e., polyvinyl chloride resin, epoxide, and organic acid anhydride, it is found that the same are employable respectively in amounts by weight of form about 43 to 63%, 19 to 39%, and 7 to 27%. Based upon a similar calculation including the fourth essential component, i.e., non-reactive plasticizer, it is found that the same can be employed in an amount up to about 19% by weight.

If the advantages of a two part formulation are not desired (see said copending application filed on even date herewith for a discussion of the purpose of this two part formulation), the heat-shield formulation of the present invention can be used in a one part formulation containing all of the necessary ingredients without departing from the basic inventive concepts previously enumerated.

Since it will undoubtedly be desired that the heat-shield coating on the label not interfere with the visual attributes of the label, pigments will normally be omitted from the formulation so that the heat shield will be effectively transparent.

As in the case of said copending applications, it is to be understood that the polyvinyl chloride resin used in the novel formulations is intended to embrace not only homopolymers of vinyl chloride but copolymers of vinyl chloride with modifying agents such as vinyl acetate or vinylidene chloride and wherein the vinyl chloride comprises the dominant portion of the copolymer. When used in this specification and claims, therefore, the term "polyvinyl chloride resin" is to be so construed.

The formulations described previously and constituting the most important inventive aspect of the present application are, as stated, formed of four essential ingredients including a polyvinyl chloride resin, an epoxide, an acid anhydride and a non-reactive plasticizer. The last-mentioned ingredient is required to provide flexibility in the more highly crosslinked, heat resistant laundry formulations and is also needed in dry cleaning formulations to provide greater resistance to solvents conventionally used (such as per-chloroethylene). There are certain applications, however (such as in dry cleaning, where hydrocarbon solvents such as Stoddard Solvent are used), where the formulation may advantageously have the non-reactive plasticizer omitted. It is within the contemplation of the present invention to include such three component formulations, though it is to be understood that the preferred and more highly versatile and superior formulations are those with the four essential components indicated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plastic label of the type comprising a plastic layer, the upper surface of which is coated with a cross-linked plastisol composition, the improvement wherein said plastisol composition comprises (a) from about 43 to about 63% by weight of a polyvinyl chloride resin, (b) from about 19 to about 39% by weight of an epoxide selected from the group consisting of linear and branched chain-aliphatic epoxides containing more than two functional sites, said epoxide having a molecular weight of from 500 to 2000, and (c) from about 7 to about 27% by weight of an organic acid anhydride containing at least two functional sites; the combined average functionality of the epoxide and acid anhydride components of said composition being at least about 5, said label having increased temperature resistance to both laundering and dry-cleaning.

2. The label of claim 1 wherein the coating of said plastisol composition on said upper surface is non-continuous.

3. The label of claim 1 wherein the coating of said plastisol composition additionally contains up to about 19% by weight of a plasticizer which is non-reactive in said plastisol composition and compatible therewith.

4. The label of claim 3 wherein the coating of said plastisol composition on said upper surface is non-continuous.

5. The label of claim 3 wherein at least a portion of said plastic layer comprises a cross-linked composition comprising (a) a polyvinyl chloride resin, (b) an epoxide selected from the group consisting of linear and branched chain-aliphatic epoxides containing more than two functional sites, (c) an organic acid anhydride containing at least two functional sites, and (d) a plasticizer which is non-reactive in said last-mentioned composition and compatible therewith; the combined average functionality of the epoxide and anhydride components of said last-mentioned composition being greater than 2 and less than about 5.

6. The label of claim 5 wherein the coating of said plastisol composition on said upper surface is non-continuous.

7. In a method of preparing a plastic label wherein a plastic layer is coated on its upper surface with a cross-linkable plastisol composition with subsequent cross-linking thereof through the application of heat, the improvement which comprises preparing a label of increased temperature resistance to both laundering and dry-cleaning by the use as said plastisol composition of a composition comprising (a) from about 43 to about 63% by weight of a polyvinyl chloride resin, (b) from about 19 to about 39% by weight of an epoxide selected from the group consisting of linear and branched chain-aliphatic epoxides containing more than two functional sites, said epoxide having a molecular weight of from 500 to 2000, and (c) from about 7 to about 27% by weight of an organic acid anhydride containing at least two functional sites; the combined average functionality of the epoxide and acid anhydride components of said composition being at least about 5.

8. The method of claim 7 wherein said plastisol composition additionally contains up to about 19% by weight of a plasticizer which is non-reactive in said plastisol composition and compatible therewith.

References Cited

UNITED STATES PATENTS

| | | | |
|---|---|---|---|
| 2,795,565 | 6/1957 | Newey | 260—30.6 |
| 2,912,397 | 11/1959 | Houska et al. | 260—23 |
| 2,965,586 | 12/1960 | Fisch et al. | 260—2.5 |
| 3,041,195 | 6/1962 | Saewert et al. | 117—41 |
| 3,236,683 | 2/1966 | Berenbaum et al. | 117—132 |
| 3,278,477 | 10/1966 | Evans | 260—30.4 |
| 3,283,936 | 11/1966 | Kehe et al. | 215—40 |
| 3,321,550 | 5/1967 | Hardman et al. | 260—836 |

DONALD E. CZAJA, Primary Examiner

R. A. WHITE, Assistant Examiner

U.S. Cl. X.R.

117—37, 138.8, 161; 260—23, 30.4, 31.6, 31.8, 78.4